3,169,878
ASBESTOS-CEMENT PRODUCTS
William H. Snyder, Nashua, N.H., assignor to Johns-Manville Corporation, New York, N.Y., a corporation of New York
No Drawing. Filed May 16, 1962, Ser. No. 195,320
16 Claims. (Cl. 106—99)

This invention relates to the manufacture of asbestos-cement and the like asbestos containing calcareous cementitious products, and more particularly to such products of improved appearance.

Asbestos fiber has for some years been utilized as reinforcement and/or filler in assorted products or articles comprising hydraulic cements and related calcareous cementitious materials or bodies thereof. The inclusion of reinforcing or fill asbestos fibers in hydraulic cementitious materials, as is apparent to those familiar with such products, results in the disfigurement of the surfaces or faces of the materials or articles thereof with so-called fiber "flowers" or "flocs" due to the flocculating tendency of asebestos fiber in aqueous media, and/or the presence of pencils, bundles or spicules of the fiber superficially embedded or positioned within but adjacent to said surfaces or faces. Although this speckled or mottled appearance of the fiber "flowers" or "flocs" and/or pencils, bundles or spicules does not comprise a noteworthy handicap in numerous applications or products wherein the item is either unexposed or visual perception is immaterial such as in the case of many construction elements or materials, this more or less unsightly defaced condition presents a decided drawback in certain applications of plain or painted asbestos-cement materials as, for example, their utility in furniture or components thereof such as table and desk tops and as chalkboard, a board substitute for slate "blackboards," particularly when the asbestos containing cement article is sanded and/or pigmented as is common in these adaptations.

Moreover, although this visual condition may in most cases simply degrade the appearance or esthetic values of the item or product, it comprises a particularly significant and damaging functional deficiency in the utilization of pigmented and sanded asbestos reinforced cement sheets as chalkboard wherein the board must provide a uniform background which sharply and distinctly contrasts with writing chalk or the markings produced therewith.

It is the primary object of this invention to provide asbestos fiber reinforced and/or filled hydraulic cement and the like calcareous cementitious materials or bodies, and products thereof, which are substantially free from fiber pencils, bundles or spicules and/or fiber "flowers" or "flocs," and provide relatively uniform appearing and unblemished surfaces or faces.

It is also an object of this invention to provide a method or means and standard of processing and blending asbestos fibers, and the fibrous products thereof for use in the manufacture of asbestos-cement articles of improved appearance and with strength or with structural characteristics equivalent to that of like conventional products.

It is a further object of this invention to provide an improved chalkboard or simulated "blackboard" products consisting of low cost and durable, pigment colored, asbestos fiber reinforced hydraulic cement sheets or slabs the sanded surface(s) of which affords a uniformly colored, unmottled background which sharply and distinctly contrasts with "blackboard" writing chalk or the markings thereof.

These and other objects and advantages of this invention will become more fully apparent from the hereinafter more detailed description thereof.

This invention is based upon the discovery that a particular blend of sized asbestos fiber substantially free of fiber pencils, bundles, clumps or spicules, or free of any such fibrous bodies or masses of appreciable area or dimensions comprises an effective reinforcement and/or filler, in conventional and typical amounts or proportions, for hydraulic cement or the like calcareous cementitious materials or bodies without the appearance of fiber "flowers" or "flocs," pencils, bundles or spicules, and the like surface blemishes, and without adverse effects upon physical or structural properties. The improved fibrous reinforcement or filler for cementitious materials of this invention consists of a blend of amosite and chrysotile fiber, each approximately milled, in proportions of from approximately 5 to 50 parts by weight of amosite and, conversely, approximately 95 to 50 parts by weight of chrysotile, depending to some degree upon the particular quality of the respective fibers.

The amosite fibrous component must be milled, fiberized or opened to the point wherein no fibers or fibrous bodies or masses such as fiber pencils, bundles or spicules remain having an area (area being determined by or equivalent to the product of the individual fibers or fibrous bodies length times their width or cross section) greater than about 2 millimeters squared and at least approximately 95% by weight of the said amosite is composed of fibers and/or fibrous bodies or masses of an area (area being determined by or equivalent to the product of the respective fibers or fibrous bodies length times their width or cross section) of less than about 0.4 millimeter squared.

The chrysotile fibrous component consists of grades and/or is milled to the extent wherein about 97% or more by weight of its contents comprising the fibers and/or fibrous bodies including pencils, bundles, or spicules, are of a length of 14 mesh or less as determined by standard McNett Wet Screen Analysis, and all of the constituent fibers or fibrous bodies thereof are of an area (area being determined by or equivalent to the product of the respective fibers or fibrous bodies length times their width or cross section), sized no greater than about 1.5 millimeters squared.

In addition to the given particle size or area of the constituent fibers or fibrous bodies of the asbestos materials, the fibrous reinforcement or filler must be composed of a blend or admixture of both amosite and chrysotile species of asbestos with each in their respective specified size classification. This is necessary as the use of short chrysotile as specified solely results in a product lacking adequate wet or precured strength whereby it is not handleable and the production rate is very low and turn uneconomical in a wet machine process. And, the use of amosite of the recited size classification by itself produces a product with poor appearance because of wild formation or unequal distribution of the fibrous material and which is too brittle for subsequent sanding and/or cutting.

Opening of the fibers or fibrous bodies and reduction thereof to their respective prerequisite size classifications or dimensions specified can be accomplished by milling with common commercially available means including, for example, roller mills or chaser mills, willows, asbestos attrition mills, centrifugal impact mills, or the like standard asbestos fiberizers or opening devices. Frequently repeated milling or multiple passes through one or more fiberizers or opening means are required to render the asbestos to their effective size categories, depending of course upon the grade and condition of the initial fiber.

Asbestos reinforcement and/or filler meeting the foregoing composition and fiber or particle specifications can be included and dispersed throughout typical calcareous cementitious materials or bodies thereof under conditions and in proportions consistent with conventional usage or application of asbestos fibers generally in like materials or products. For example, the blends of milled to size fiber of this invention can be combined with an incorporated in cementitious bodies or articles thereof in all proportions ranging up to about 50 or 60% by weight or the total body or article, or typically in a range of about 5 or 10 to 50% by weight of the product, and preferably in amounts of about 20 to 40% by weight, varying somewhat with the quality of the fibrous constituent and the requirements of the particular product.

As indicated, the cementitious phase of the products of this invention may comprise any of a number of hydraulic or chemically "setting" or "curing" materials including, but not limited to, Portland cements, alumina cements, slag cements, and hydrated sand-lime or calcium silicate compositions, but most frequently would comprise ordinary hydraulic setting Portland cements consonant with common commercial asbestos-cement products.

The bonding phase comprising the Portland cement composition(s) or material(s) providing the matrix or encompassing body may also comprise other reactants and/or fillers conformable with practices of the asbestos-cement industry. This includes the addition of various forms of silica such as sand, diatomaceous earth, tripoli, or quartz, wherein the degree of reaction or interaction, if any, between the silica and the cementitious material(s) depends primarily upon curing or hydration conditions, particularly hydrothermal conditions, and assorted non-reacting or "inert" fillers and coloring pigments, conventional cement additives or modifiers, such as air entraining agents, accelerators or retarders, gelling or thickening agents, etc. Moreover, the cure of the cementitious phase of the product can be effected or accelerated pursuant to usual practices including the so-called normal or air cure, underwater cure, or the relatively common steam or autoclave cure.

The products or articles comprising the fibrous reinforcement and/or filler of this invention with a cohesive cementitious phase are producible or can be formed according to wet machine procedures or the so-called Hatchek process, dry machine procedures or the so-called Norton process, or simply by shaping or casting an appropriate mix, either with or without consolidating pressures, but their manufacture is particularly effectual in a wet machine process such as illustrated by United States Letters Patent No. 2,182,353 to Rembert et al.

As set forth hereinbefore, this method of producing asbestos reinforced and milled cementitious materials or compositions and the products thereof are particularly adapted to the manufacture and advantageous utilization of enhanced asbestos-cement products as improved chalkboards and furniture components. The following example illustrates the application of the novel concepts of this invention in preparing and applying asbestos reinforcement in the wet machine manufacture of asbestos-cement sheet for use as chalkboard. It is to be understood that this example is given for purposes of illustration rather than limitation and that the specific constituents, other than the asbestos fiber component, or products produced therefrom, techniques or procedures, and conditions set forth are merely exemplary and are not to be construed as limiting the invention to any particular means or conditions.

*Example*

A blend of 15 parts by weight of amosite fiber and 85 parts by weight of chrysotile fiber was prepared as follows:

Amosite fiber of MD grade (that is comprising a range of average fiber lengths of ½ to 2 inches) was processed through a series of two attrition mills, then twice willowed on a standard asbestos fiberizing willow, and finally subjected to two passes through an Entoleter, Incorporated, centrifugal impact mill fiber opener. This series of milling or processing reduced the material whereby all constituent particles of fiber or fiber bodies, including pencils, bundles or spicules, were of an area (area being determined by the product of the particle length times its width or cross section) of a size no larger than about 2 millimeters squared and at least about 95% by weight of said fibers or fibrous bodies of an area of less than about 0.4 millimeter squared.

A 7M grade, or shorts of chrysotile fiber with about 97% by weight of the fiber content of lengths of 14 mesh or less was twice willowed on a standard fiberizing willow, followed by two passes through an Entoleter, Incorporated centrifugal impact fiber opener whereby all constituent fibers or fibrous bodies were reduced to particles of an area (area being defined by the product of particle length times its width or cross section), sized less than about 1.5 millimeters squared.

A blend of 15 parts by weight of the milled amosite and 85 parts by weight of the milled chrysotile was utilized in a standard commercial wet machine manufacturing process for asbestos fiber reinforced Portland cement sheet products for use as chalkboard comprising the following formula, in percent by weight:

| | Percent by weight |
|---|---|
| Asbestos blend | 34 |
| Portland cement | 37 |
| Silica | 22 |
| Carbon black pigment | 7 |
| | 100 |

This batch formula, upon dispersion in water in a water-to-solids ratio of 6:1, was collected and consolidated into sheets 4 feet x 8 feet pursuant to common forming practices and compressed at 2000 p.s.i.g. to a thickness of $5/16$ inch and a density of approximately 110 p.c.f. Upon 2 days air curing the sheets were steam cured for 16 hours at 100 p.s.i.g. and sanded on one surface. The resulting asbestos-cement sheet products were substantially completely free of fiber "flowers" or "flocs" and/or pencils, bundles or spicules of fibers or fibrous bodies, or the like imperfections, and they exhibited relatively uniform and unblemished surfaces or faces.

The term "fibrous body" or "fibrous bodies," as used in this specification and in the claims, designates fibrous particles or clumps of fibers referred to and identified in the asbestos industry as "pencils," "bundles," or "spicules," and flocculated agglomerates of fiber such as fiber "flowers" or "flocs." And, the term "area," when referring to particle size of the fiber(s) or fibrous body(ies) in this specification and the claims, represents or is defined by the product of the length times the width or cross section dimensions of the fiber or fibrous body.

It will be understood that the foregoing details are given for purposes of illustration, not restriction, and that variations within the spirit of this invention are intended to be included within the scope of the appended claims.

What I claim is:

1. A consolidated and compressed article of manufacture consisting of a calcareous cementitious matrix containing incorporated throughout in amount up to approximately 60% by weight of the article, asbestos reinforcement and filler composed of a blend of: approximately 5 to 50 parts by weight of amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of chrysotile fiber of grades having about 97% by weight of the fiber content of lengths not more than 14 mesh and with the fibers and fibrous bodies thereof of an area, determined by the product of their length times their width, sized no greater than about 1.5 millimeters squared.

2. A consolidated and compressed article of manufacture consisting of a calcareous cementitious matrix containing incorporated throughout in amount of approximately 5 to 60% by weight of the article, asbestos reinforcement and filler composed of a blend of: approximately 5 to 50 parts by weight of amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of chrysotile fiber of grades having about 97% by weight of the fiber content of lengths not more than 14 mesh and with the fibers and fibrous bodies thereof of an area, determined by the product of their length times their width, sized no greater than about 1.5 millimeters squared.

3. The article of manufacture of claim 2 wherein the calcareous cementitious matrix comprises a hydraulic setting cement.

4. The article of manufacture of claim 2 wherein the calcareous cementitious matrix comprises Portland cement.

5. A consolidated and compressed article of manufacture consisting of a hydraulic setting calcareous cementitious matrix containing incorporated throughout in amount approximately 10 to 50% by weight of the article, asbestos reinforcement and filler composed of a blend of: approximately 5 to 50 parts by weight of amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of chrysotile fiber of grades having about 97% by weight of the fiber content of lengths not more than 14 mesh and with the fibers and fibrous bodies thereof of an area, determined by the product of their length times their width, sized no greater than about 1.5 millimeters squared.

6. A consolidated and compressed of manufacture consisting of a hydrated Portland cement matrix containing incorporated throughout in amount approximately 10 to 50% by weight of the article, asbestos reinforcement and filler composed of a blend of: approximately 5 to 50 parts by weight of amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of chrysotile fiber of grades having about 97% by weight of the fiber content of lengths not more than 14 mesh and with the fibers and fibrous bodies thereof of an area, determined by the product of their length times their width, sized no greater than about 1.5 millimeters squared.

7. A consolidated and compressed article of manufacture consisting of an autoclaved Portland cement and silica matrix containing incorporated throughout in amount approximately 10 to 50% by weight of the article, asbestos reinforcement and filler composed of a blend of: approximately 5 to 50 parts by weight of amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of chrysotile fiber of grades having about 97% by weight of the fiber content of lengths not more than 14 mesh and with the fibers and fibrous bodies thereof of an area, determined by the product of their length times their width, sized no greater than about 1.5 millimeters squared.

8. A consolidated and compressed article of manufacture consisting of a hydrated Portland cement matrix containing incorporated throughout in amount of approximately 20 to 50% by weight of the article, asbestos reinforcement and filler composed of a blend of: approximately 5 to 50 parts by weight of MD grade amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of 7M grade chrysotile fiber having about 97% by weight of the fiber content of lengths not more than 14 mesh and with the fibers and fibrous bodies thereof of an area, determined by the product of their length times their width, sized no greater than about 1.5 millimeters squared.

9. A consolidated and compressed article of manufacture consisting of an autoclaved Portland cement and silica matrix containing incorporated throughout in amount of approximately 20 to 50% by weight of the article, asbestos reinforcement and filler composed of a blend off: approximately 5 to 50 parts by weight of MD grade amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 95 to 50 parts by weight of 7M grade chrysotile fiber having about 97% by weight of the fiber content of lengths not more than 14 mesh and with the fibers and fibrous bodies thereof of an area, determined by the product of their length times their width, sized no greater than about 1.5 millimeters squared.

10. A consolidated and compressed asbestos-cement chalkboard consisting of an autoclaved Portland cement and silica matrix containing incorporated throughout in amount of approximately 35% by weight of the chalkboard, asbestos reinforcement and filler composed of a blend of: approximately 15 parts by weight of MD grade amosite fiber with the fibers and fibrous bodies thereof of an area, determined by the product of their length times their width, sized no greater than about 2 millimeters squared, and at least approximately 95% by weight of the said fibers and fibrous bodies being of an area not more than about 0.4 millimeter squared; and approximately 85 parts by weight of 7M grade chrysotile fiber having about 97% by weight of the fiber content of lengths not more than 14 mesh and with the fibers and fibrous bodies thereof of an area, determined by the product of their length times their width, sized no greater than about 1.5 millimeters squared.

11. The method of manufacturing asbestos-cement products of improved appearance comprising the steps of:

(a) milling amosite fiber and reducing the respective fibers and fibrous bodies thereof to an area, determined by the products of their length times their width, sized no greater than about 2 millimeters squared, and at least approximately 95% by weight of fibers and fibrous bodies to an area not more than about 0.4 millimeter squared;

(b) milling chrysotile fiber of grades having about 97% by weight of its fiber content of lengths not more than 14 mesh and reducing the respective fibers and fibrous bodies thereof to an area, determined by the product of their length times their width, sized no greater than about 1.5 millimeters squared;

(c) blending the so milled asbestos fibers in ratios of approximately 5 to 50 parts by weight of amosite and approximately 95 to 50 parts by weight of chrysotile;

(d) admixing the said asbestos fiber blend with a calcareous cementitious materials in amounts up to approximately 60% by weight of the said cementitious material and with sufficient water to hydrate the cementitious material; and, (e) shaping the said admixture comprising the asbestos fiber blend and calcareous cementitious material, and consolidating the same into a shape retaining article.

12. The method of manufacturing asbestos-cement products of improved appearance comprising the steps of:

(a) milling amosite fiber and reducing the respective fibers and fibrous bodies thereof to an area, determined by the product of their length times their width, sized no greater than about 2 millimeters squared, and at least approximately 95% by weight of the said fibers and fibrous bodies to an area not more than about 0.4 millimeter squared;

(b) milling chrysotile fiber of grades having about 97% by weight of its fiber content of lengths not more than 14 mesh and reducing the respective fibers and fibrous bodies thereof to an area, determined by the product of their length times their width, sized no greater than about 1.5 millimeters squared;

(c) blending the so milled asbestos fibers in ratios of approximately 5 to 50 parts by weight of amosite and approximately 95 to 50 parts by weight of chrysotile;

(d) providing an aqueous slurry including the said asbestos fiber blend and a calcareous cementitious material with the asbestos fiber present in amounts up to approximately 60% by weight of the total slurry solids; and, (e) collecting the wet solids from the slurry and consolidating the same into a shaped article.

13. The method of claim 12 wherein the calcareous cementitious material comprises Portland cement.

14. The method of claim 12 wherein the calcerous cementitious material comprises Portland cement and silica.

15. The method of claim 14 wherein the shaped article containing the calcareous cementitious material comprising Portland cement and silica is autoclaved.

16. The method of manufacturing asbestos-cement chalkboard of improved appearance comprising the steps of:

(a) milling MD grade amosite fiber and reducing the respective fibers and fibrous bodies thereof to an area, determined by the product of their length times their width, sized no greater than about 2 millimeters squared, and at least aproximately 95% by weight of said fibers and fibrous bodies to an area not more than about 0.4 millimeter squared;

(b) milling 7M grade crysotile fiber having about 97% by weight of its fiber content of length not more than 14 mesh and reducing the respective fibers and fibrous bodies thereof to an area, determined by the product of their length times their width, sized no greater than about 1.5 millimeters squared;

(c) blending the so milled asbestos fibers in a ratio of approximately 15 parts by weight of amosite and approximately 85 parts by weight of chrysotile;

(d) providing an aqueous slurry including the said asbestos fiber blend and Portland cement and silica in proportions of approximately 35% by weight of fiber based on the total slurry solids content;

(e) collecting the wet solids from the slurry and consolidating the same into a shaped slab approximately 110 p.c.f. density; and, (f) autoclaving the shaped slab.

References Cited in the file of this patent
UNITED STATES PATENTS

| | | |
|---|---|---|
| 2,326,516 | Brown | Aug. 10, 1943 |
| 2,421,721 | Smith et al. | June 3, 1947 |
| 2,565,340 | Anderson | Aug. 21, 1951 |
| 2,888,377 | Allen | May 26, 1959 |